United States Patent [19]

Knollman

[11] 4,049,920

[45] Sept. 20, 1977

[54] ANALOG SIGNAL SUMMING CONFERENCE CIRCUIT

[75] Inventor: Dieter John Henry Knollman, Arvada, Colo.

[73] Assignee: Bell Telephone Laboratories, Incorporated, Murray Hill, N.J.

[21] Appl. No.: 733,380

[22] Filed: Oct. 18, 1976

[51] Int. Cl.² ............................................. H04M 3/56
[52] U.S. Cl. ............................................... 179/18 BC
[58] Field of Search ................................... 179/18 BC

[56] References Cited

U.S. PATENT DOCUMENTS

3,991,280  11/1976  James et al. .................... 179/18 BC

Primary Examiner—William C. Cooper
Attorney, Agent, or Firm—Charles Scott Phelan

[57] ABSTRACT

This specification discloses a telephone conferencing arrangement employed with a plurality of conference interface ports in a time division multiplex (TDM), private branch exchange (PBX). Each port receives from the PBX the TDM conference signal of a respectively associated conferee and transmits an analog version of the conference signal to the conferencing system. Conferencing is achieved by combining the analog conference signals into a plurality of composite signals which are subsequently recombined via resistance-value related conductive paths with the uncombined analog conference signals in selectable transmission phases and amplitudes so as to provide at the receiving terminal of each conference interface port a composite signal comprised of the selectably phased conference signals transmitted by the other conference interface ports. Thus, when the PBX retransmits to the conferencing system a portion of each of the received composite signals, the retransmissions tend to cancel each other, thereby preventing regenerative instability in the conferencing system.

8 Claims, 4 Drawing Figures

| FROM \ TO | RL1 | RL2 | RL3 | RL4 | RL5 | RL6 | RT1 | RT2 |
|---|---|---|---|---|---|---|---|---|
| TL1 | 0 | − | + | + | − | + | + | + |
| TL2 | + | 0 | + | + | − | + | + | + |
| TL3 | + | − | 0 | + | − | + | + | + |
| TL4 | + | + | − | 0 | − | + | + | + |
| TL5 | + | − | − | + | 0 | + | + | + |
| TL6 | + | − | − | + | − | 0 | + | + |
| TT1 | − | + | + | − | + | − | 0 | + |
| TT2 | + | − | − | + | − | + | + | 0 |

FIG. 3

CONFERENCE PORTS SHOWN IN FIG. 1

| NUMBER OF CONFEREES OF EACH TYPE | L1 | L2 | L3 | L4 | L5 | L6 | T1 | T2 | SUM |
|---|---|---|---|---|---|---|---|---|---|
| 2T-0L | | | | | | | +3 | +3 | +6 |
| 2T-1L | 0 | | | | | | +1.5 | +4.5 | +6 |
| 2T-2L | −.5 | −.5 | | | | | +3 | +3 | +5 |
| 2T-3L | 0 | −1 | 0 | | | | +4.5 | +1.5 | +5 |
| 2T-4L | +.5 | −.5 | −.5 | +.5 | | | +3 | +3 | +6 |
| * 2T-5L | 0 | 0 | 0 | 0 | 0 | | +4.5 | +1.5 | +6 |
| * 2T-6L | +.5 | −.5 | −.5 | +.5 | −.5 | −.5 | +3 | +3 | +5 |
| 1T-1L | −1.5 | | | | | | −1.5 | | −3 |
| 1T-2L | −2 | +1 | | | | | 0 | | −1 |
| 1T-3L | −1.5 | +.5 | +1.5 | | | | +1.5 | | +2 |
| 1T-4L | −1 | +1 | +1 | −1 | | | 0 | | 0 |
| 1T-5L | −1.5 | +1.5 | +1.5 | −1.5 | +1.5 | | +1.5 | | +3 |
| * 1T-6L | −1 | +1 | +1 | −1 | +1 | −2 | 0 | | −1 |
| 2L | −.5 | −.5 | | | | | | | −1 |
| 3L | 0 | −1 | 0 | | | | | | −1 |
| 4L | +.5 | −.5 | −.5 | +.5 | | | | | 0 |
| 5L | 0 | 0 | 0 | 0 | 0 | | | | 0 |
| 6L | +.5 | −.5 | −.5 | +.5 | −.5 | −.5 | | | −1 |

FIG. 4

ANALOG SIGNAL SUMMING CONFERENCE CIRCUIT

BACKGROUND OF THE INVENTION

1. Field of the Invention

This invention relates to telephone systems and, more particularly, to arrangements for establishing a simultaneous interchange of information among three or more telephone lines.

2. Description of the Prior Art

Ordinarily, the conventional telephone instrument employs a pair of conductors for both the transmitting and the receiving functions, which bilateral transmission arrangement is known in the art as two-wire operation. In ordinary telephone service where communication is established between two telephones, the instruments are simply wired in parallel. Such simple parallel wiring serves adequately for two or three telephones; however, as the number of parallel-wired telephone instruments is increased, the information signal transmitted by any one telephone becomes so severely loaded by the plural parallel receivers that the signal received by each is reduced to an unacceptably low level. Obviously, signal amplification would solve this problem, but the two-wire line is employed for both receiving and transmitting, and available amplifiers are unidirectional.

The prior art has thrust at the above problem by providing arrangements whereby the transmitting and receiving functions are separated from one another in such a manner that each employs a pair of conductors—four-wire operation. Operational amplifiers of hybrid construction are generally employed to accomplish the two-wire to four-wire conversion. A circuit employing operational amplifiers to accomplish the conversion is disclosed in U.S. Pat. No. 3,828,146, which issued on Aug. 6, 1974 to T. G. Lewis.

In some prior art circuits, the two-wire to four-wire conversion circuit is incorporated into the conferencing bridge. One such arrangement which is well known in the art is disclosed in U.S. Pat. No. 3,108,157, which issued on Oct. 22, 1963 to A. Feiner. Feiner discloses a conferencing arrangement employing controlled inductive coupling in addition to operational amplifiers. Severe impedance mismatches are employed to effectively isolate some transformer port pairs, while matched impedances couple other port pairs. Such selective isolation of transformer port pairs prevents regenerative recirculation and enables the use of amplifiers. However, such a predictable inductive coupling arrangement requires close manufacturing tolerances which are maintained at the expense of weight, size, and cost.

A major problem with prior art conferencing arrangements lies in the recirculative nature of hybrid port circuits which connect the two-wire telephone lines to the four-wire PBX. Each hybrid port circuit provides a conductor pair for transmitting signals into the PBX and a conductor pair for receiving signals from the PBX, thereby permitting the use of unidirectional amplifiers. However, signals received by a hybrid port circuit are not completely isolated from the hybrid port circuit's transmitting conductor-pair, with the result that a portion of the received signals is retransmitted via the PBX to the conference circuit. The retransmitted contributions of the plural hybrid port circuits in a PBX which contains a conferencing arrangement can add in amplitude and phase, resulting in a sustained oscillating state which yields objectionable distortion and howling noise, rendering the conference virtually useless. The obvious method of reducing the possibility of this form of instability is to improve the hybrid port circuits to decrease the amount of coupling between the transmit and receive paths and thereby reduce the magnitude of the retransmission. Such coupling is minimized when the input impedance of the hybrid port circuit matches that of the telephone line. The impedance of the telephone line, however, is a function of line length, and, therefore, not predeterminable.

In addition to the above-mentioned hybrid port circuits which connect the two-wire lines to the four-wire PBX, the PBX in which the specific illustrative embodiment of the present invention is used employs a second type of port circuit, which is hereinafter referred to as a conference interface port circuit, for interfacing the four-wire PBX and the subject conference circuit. A conference interface port is provided to transmit to the conference circuit the conference signal from an associated conferee, and to transmit to the conferee via the PBX the conferenced signals received from the conference circuit. However, the operational characteristics of a PBX in which the specific illustrative embodiment of the invention may be employed necessitate that each conference interface port perform a signal subtraction function. The signal received by the conference interface port from the PBX is comprised not only of the conference signal from the associated conferee, but also portions of the already combined conference signals. the combined conference signals are redelivered to the conference interface ports from two sources. First, the hybrid port circuits which connect the two-wire telephone conferee to the four-wire PBX rettransmit to the PBX, and consequently to the conference interface port, a portion of the received combined conference signals. Second, the PBX contains summing amplifiers which combine the already combined conference signals onto the bus which carries the TDM signals from the individual conferees. Each conference interface port circuit, therefore, must subtract the combined conference signals from the received signals to recover the signal from the individual conferee. A prior art port circuit which performs a similar signal subtraction function is disclosed in detail in U.S. Pat. No. 3,835,259 which issued on Sept. 10, 1974 to D. G. Medill and P. A. Vachon. It should be noted, however, that the conference interface ports employed to connect the illustrative embodiment of the present invention to the PBX do not subtract all of the combined conference signals from the received signals. Only the combined conference signals which return to the conference interface ports as a result of the signal summing function in the PBX are subtracted. These can be subtracted because the gain of the summing amplifiers in the PBX is known. The magnitude of the combined conference signals which return to the conference interface ports as a result of retransmission by the hybrid port circuits is not so determinable, and, therefore, such combined conference signals are passed on with the conference signal from the individual conferee to the conference circuit where they are cancelled in accordance with the principles of the present invention.

Accordingly, it is an object of this invention to provide an economical conference arrangement.

It is another object of this invention to provide a conference arrangement which remains stable for different numbers of conferees,

SUMMARY OF THE INVENTION

In accordance with an illustrative embodiment of the invention, the foregoing and other problems of the prior art are solved by providing circuitry which interconnects the conference receive and transmit terminals of plural conference interface ports in such a manner that any number up to a selectable maximum number of conferees can maintain a stable conference. By means of phase inversion, the conference circuit disclosed in this specification reduces the net sum of the retransmitted signals delivered to the conference circuit by the conference interface ports. The signal received by the conference circuit from any conference interface port is transmitted by the conference circuit to some of the other conference interface ports in normal, noninverted phase, and to the remaining conference interface ports in inverted phase, in accordance with a fixed transmission phase scheme.

Port-to-port transmission within the conference circuit is accomplished by combining selectable ones of the conference signals with one another to form plural composite signals. Selectable ones of the composite signals are inverted in phase and distributed, along with the inverted composite signals and the uncombined conference signals, to the conference interface ports via resistive electrical paths. Thus, there is provided at the receiving terminal of each conference interface port a separate composite signal comprised of the selectably phased conference signals from the transmitting terminal of each of the other conference interface ports, with substantially no component of the conference signal transmitted by the receiving conference interface port.

It is a feature of this invention that any cpombination of inverted phase and normal phase signal transmissions can be implemented between conference interface ports.

It is another feature of this invention that conference sources which transmit signals of characteristically different amplitudes can be accommodated in a conference. This invention provides means by which the signals from the different conference sources and the losses in the conference system can be substantially equalized to maintain substantially uniform transmission levels in the conference.

It is another feature of this invention that port circuits of the type which retransmit a portion of the received signals may be used. Such port circuits are less costly to manufacture than fully isolated arrangements, thereby providing a cost advantage.

BRIEF DESCRIPTION OF THE DRAWINGS

This invention may be more easily comprehended by reading the following detailed description in conjunction with the accompanying figures in which.

DETAILED DESCRIPTION

Figure 1:
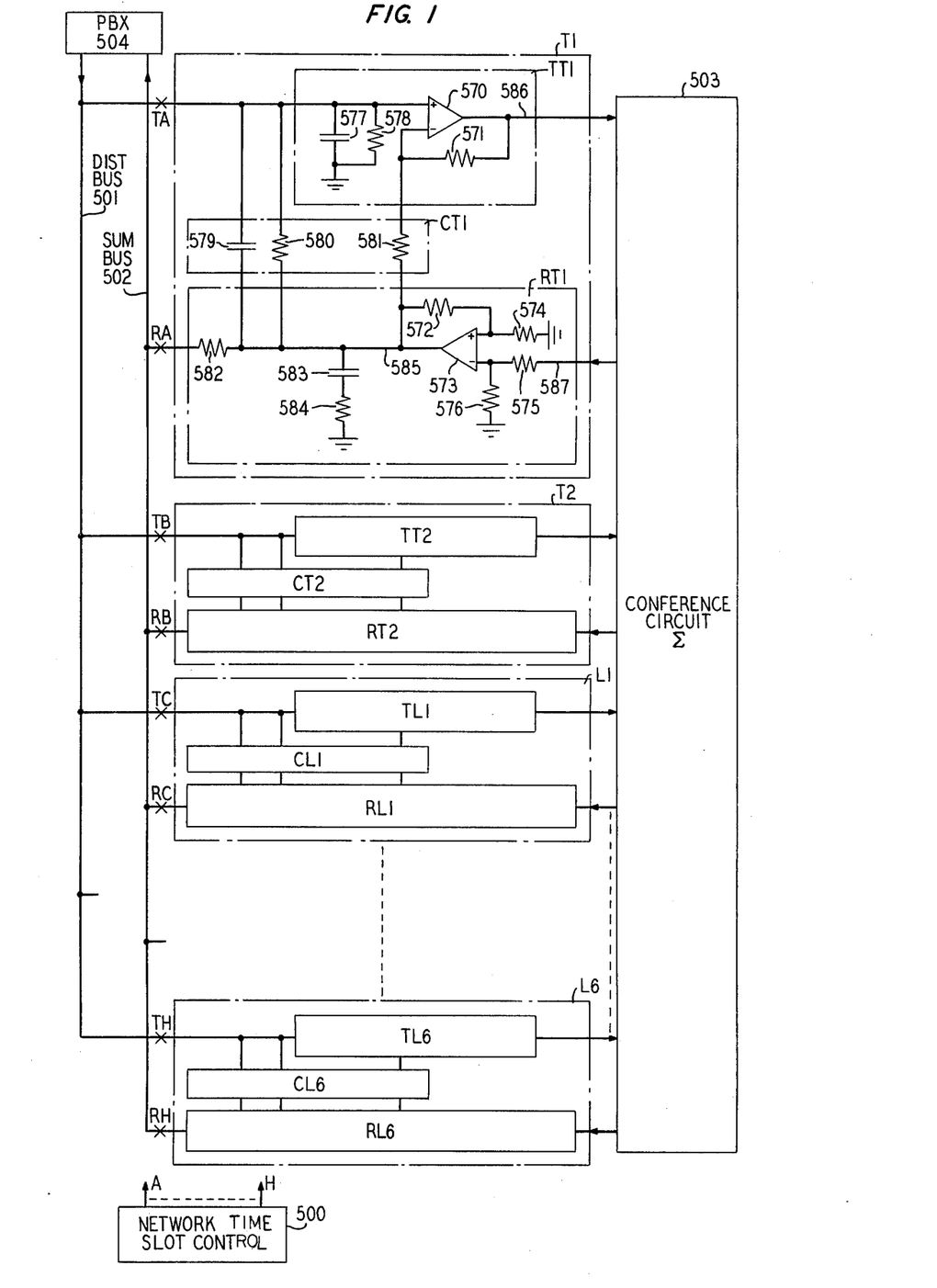
FIG. 1 shows in schematic and block and line form conference interface port circuits which serve to interface the conference circuit and TDM buses from a PBX.

FIG. 1 shows eight conference interface port circuits which are employed to interface an illustrative embodiment of the conference circuit, represented in this figure by block 503, and TDM buses 501 and 502 connected to PBX 504. In a PBX installation of the type in which this invention may be employed, many two-wire telephone lines and trunks (not shown) are each connected to the PBX system via hybrid port circuits (not shown) of the type known in the art which convert the two-wire lines and trunks to four-wire operation. Such an arrangement creates separate transmitting and receiving signal paths (not shown) for each line and trunk connected to the PBX. The transmitting signal path of each operative line and trunk is periodically sampled by circuitry contained in PBX 504 to form pulse amplitude modulation (PAM) signal trains, which signal trains are electronically multiplexed in a predetermined time sequence present on the DIST bus 501. Similarly, the receiving signal paths are multiplexed in a predetermined time sequence present on the SUM bus 502, which multiplexing sequence coincides with the multiplexing sequence of the PAM transmission signal train. This provides each lines and trunk with a time slot during which it can interchange information with other lines and trunks via the PBX.

Conference interface port circuit T1, shown schematically in FIG. 1, is structurally identical to conference interface ports T2 and L1 through L6, of which L2 through L5 are not specifically shown, and is of the type which contains filtering circuitry (577, 578) for converting the PAM signal trains received from DIST bus 501 to analog audio signals which are transmitted to the conference circuit via conductor 586. Unlike conventional hybrid port circuits which convert two-wire telephone lines to four-wire operation, this conference interface port inerfaces the four-wire TDM signals issued by PBX 504 via buses 501 and 502 with the four-wire audio mixing conference circuit 503. One such port circuit which is structurally similar to those shown in FIG. 1 is disclosed and explained in detail in U.S. Pat. No. 3,934,099, which issued on Jan. 20, 1976 to J. M. Elder, Jr.

Each conference interface port circuit shown in FIG. 1 is divided into three interconnected function blocks: a transmitting block (T series) such as TT1 in conference interface port T1, a receiving block (R series) such as RT1, and a coupling block (C series) such as CT1. Referring to conference interface port T1 which is illustrative of the operation of the other conference interface ports, function block TT1 receives the PAM information signal from PBX 504 via DIST bus 501 and TDM switch TA, converts the PAM signal to analog audio by operation of capacitor 577 and resistor 578, which drive amplifier 570, and transmits the analog audio signal to conference circuit 503. Function block RT1 receives the combined conference analog signals from the conference circuit via conductor 587 and resistor 575 and transmits them to the PBX via amplifier 573, conductor 585, resistor 582, TDM switch RA and SUM bus 502. In each conference interface port circuit, the transmit function block is connected to the receive function block by a coupling block, which is identified as CT1 in conference port T1, and is comprised of capacitor 579 and resistors 580 and 581. These circuit components provide the means by which the signal supplied to the SUM bus is subtracted from the signals on the DIST bus to recover the incoming conference signal. As previously explained, such signal subtraction by the conference interface port circuit is necessitated by the fact that, in this embodiment of the invention, the signal received by the conference interface port circuit from the DIST bus contains not only the conference signal from the associated conferee, but also a second signal component comprised of a portion of the combined conference signals which are received and retransmitted by the hybrid port circuits which connect the two-wire lines to the PBX, and a third signal component which is comprised of the combined conference signals on the SUM bus which are added to the signals on the DIST bus by summing amplifiers (not shown) internal to the PBX.

Combined conference signals are received from the conference circuit 503 at the phase normal (+) input terminal of receive amplifier 573 via conductor 587 and resistor 575. The output of amplifier 573 is conducted via conductor 585 and the parallel combination of capacitor 579 and resistor 580 to the phase normal (+) input of transmit amplifier 570. Resistor 581 conducts the combined conference signals to the inverting (−) input of amplifier 570. The advantageous selection of the values of the circuit components contained in the coupling block enable the signal subtraction function to be performed. Such component value selection would be obvious to persons skilled in the art.

Each of the conference interface port circuits depicted in FIG. 1 is connected to the SUM and DIST buses, 502 and 501, respectively, during respective time slots which are assigned by network time slot control 500. Network time slot control 500 is shown with eight outputs, identified by the letters A through H, each of which provides an enabling output to close the TDM switches to which it is connected during a time slot identified by the same letter notation. The first letter of the two-letter code which identifies each TDM switch indicates whether the switch is in the transmit (T) or receive (R) path of the associated conference interface port. The second letter identifies the time slot during which the switch is closed. For example, TDM switches TA and RA which are located in the respective transmit and receive paths of conference interface port T1 are simultaneously closed by network time slot control 500 during time slot A. Network time slot control 500 is not an element of the invention; however, it is shown as a function block for controlling the assignment of time slots to the conferees. Although eight conference interface ports are shown, the specific illustrative embodiment of the invention is a six-party conference circuit. Network time slot control 500 limits the number of conferees to six by not assigning more than six time slots to the conference.

In the illustrative embodiment, six of the conference interface ports, L1 to L6, service line conferees, and the remaining two conference interface ports, T1 and T2, service trunk conferees. Separate sets of conference interface ports are provided for the line and trunk conferees because their respective information signals have different characteristics. Generally, trunk circuits have active gain elements such as periodically spaced repeater amplifiers incorporated within them and provide information signals of lesser amplitude than line circuits. This requires that trunk conferees be provided with higher conference circuit gain and hybrid port gain than line conferees in order to achieve uniform transmission levels in the system. Such elevated gain decreases the stability margin seen at the trunk conference interface ports. In addition, the elevated system gain seen at these trunk ports may cause coupling between the trunk conference interface ports and the gain elements in the trunk circuits, further increasing the possibility of instability. Such instability is especially possible in installations where the hybrid trunk ports which connect the two-wire trunks to the PBX have poor return loss.

With reference to FIG. 1, a potentially oscillatory loop condition can be created as follows: Assume a conference signal from conference interface port T1 enters conference circuit 503 via conductor 586 which connects the conference circuit to transmit function block TT1. The conference signal is delivered to the remaining conference interface ports, i.e. T2 and L1 through L6, at their respective receiver function blocks. Since, as hereinbefore stated, the transmitting function block of each conference interface port redelivers to the conference circuit the portion of the received signal which is retransmitted by the associated hybrid port circuit, the signal contributions from the plural remaining conference interface ports are summed by the conference circuit and delivered to receiving function block RT1 of conference interface port T1. This signal is transmitted through PBX 504 and delivered to the hybrid port circuit (not shown) of the conferee associated with conference inerface port T1, where a portion of it is retransmitted and subsequently redelivered to the conference circuit via transmitting function block TT1, thereby completing a signal loop. If the sum of the signal contributions from the remaining conference interface ports is sufficiently high, the loop will enter a state of regenerative instability. An effective way to assure that the sum of the signal contributions from the remaining conference interface ports is low is to transmit to some of the conference interface ports in normal phase, and to the rest in inverted phases. In this manner, when the signal contributions of the remaining conference interface ports is summed in the conference circuit, the negative phase retransmissions will subtractively cancel the normal phase retransmissions with the effect that the net sum of all retransmissions is reduced sufficiently to prevent regeneration.

Figure 2:
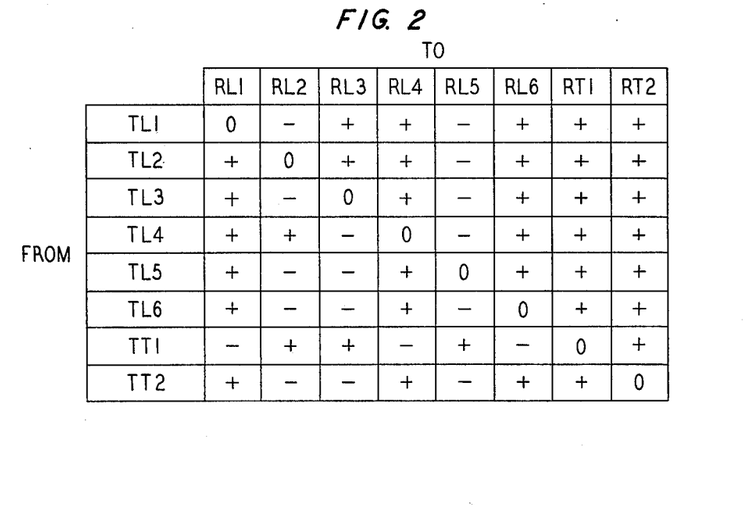
FIG. 2 is a transmission phase matrix which has been developed in accordance with the principles of the invention and shows the phase of the transmission from each conference interface port to every other conference interface port in the exemplary embodiment.

FIG. 2 is a transmission phase matrix which indicates whether the phase of the transmission of a conference signal from any one conference interface port to any other conference interface port through conference circuit 503 in FIG. 1 shall be normal (+) or inverted (−), or whether there is no transmission (0). The identification symbols in the left-hand column and at the head of each column in FIG. 2 are correlated to the symbols which identify the transmit and receiver function blocks in the conference interface ports shown in FIG. 1. It is evident from the matrix that the conference circuit will not deliver to any conference interface port its own transmitted signal. For example, transmission of a conference signal from TL1 to RL1 is shown as "0", which indicates no transmission. There is, however, transmission from TL1 to each of the other receiving function blocks.

The matrix of FIG. 2 is developed from a trial-and-error phase selection process which begins with selecting the transmission phases between two conference ports connected to one another. When two hypothetical conference ports, A and B, are connected to one another via any given interconnection system, a two-part transmission loop is created. Assuming non-ideal operation of the conference ports, each will receive the signal transmitted by the other, and the receiving conference port will retransmit to the transmitting port a portion of the received signal. Thus, conference port B receives the transmission from port A, and retransmits to port A a portion of the original received signal in the same phase that the signal was received. Similarly, port A receives the retransmission from port B and re-retransmits a portion of the same signal back to B, thereby completing a loop. The magnitude of the transmission from port B, as viewed from port A, is the product of the actual retransmission by port B times the gain of the interconnecting system to and from port B. It becomes apparent, therefore, that, if the net sum of the product of the retransmission by each port and the opposite port-to-port gains through the interconnecting system reaches or exceeds unity, regenerative instability will result. It has been determined, however, that even before unity loop gain is reached, stable but high net loop gains cause increased loss distortion. It is, therefore, desirable to achieve and maintain reasonably low net loop gain sums because the magnitude of the net loop gain sum determines the stability margin and loss distortion characteristics of the two-port loop.

An hypothetical conference arrangement which is analogous to the illustrative embodiment is developed by sequentially adding conference port circuits to a two-port loop. For sake of facilitating the analysis, it is assumed that the retransmission characteristics of the hypothetical conference ports are identical to each other. However, as previously stated, the illustrated embodiment of the conference circuit provides elevated interconnecting system and hybrid port gain to those conference ports which service trunk conferees. Thus, as the hypothetical conference is developed, three types of two-port loops are possible, i.e., conference trunk port to conference trunk port, conference trunk port to conference line port, and conference line port to conference line port.

Overall system gains, including the gains of the hybrid ports which connect the lines and trunks to the PBX, amplifier gains which interconnect line buses and trunk buses (not shown) within the PBX, and conference circuit gains, are known at specific frequencies for the PBX system in which this invention may be employed. In the PBX system in which the specific illustrative embodiment of the invention is employed, hybrid ports which connect trunks to the PBX generate greater retransmissions then hybrid ports which connect lines. It has been determined that line retransmissions are 0.78 times the trunk retransmissions. It has further been determined that after being transmitted through the less-than-unity gain amplifiers in the PBX, and the conference gain elements, a trunk which transmits to a second trunk in a loop, which loop comprises the overall system, has a net retransmission gain of 0.330. Trunks that transmit to lines in a similar loop have a net retransmission gain of 0.126, and lines that transmit to lines have a net retransmission gain of 0.05. To facilitate hand calculations, these gains are rounded off and multiplied by ten. Consequently, trunk-to-trunk loops have a normalized gain of 3, trunk-to-line loops have a normalized gain of 1.5, and line-to-line loops have a normalized gain of 0.5. Also, such normalization requires that unity loop gain be represented by a gain of 10.

With the foregoing in mind, as the hypothetical conferences are constructed, the gain seen at any one conference port is the sum of the normalized gains of all the two-port loops in which the conference port is included. For example, in a three-party conference, each of the conference ports is included in a two-port loop with the other two conference ports; therefore, the net gain seen at each conference port is the algebraic sum of the normalized loop gains for each of the two-port loops.

Figure 3:
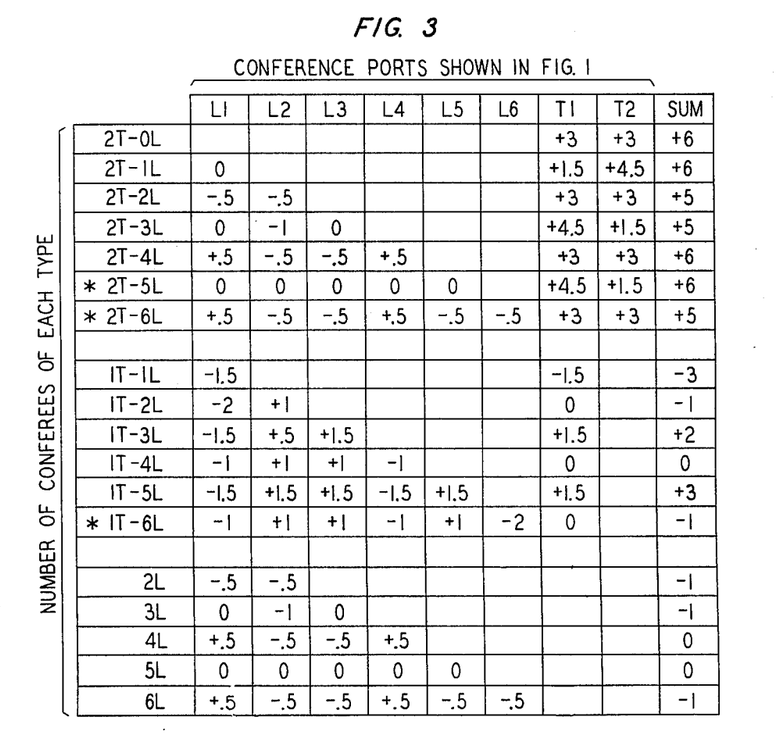
FIG. 3 is a summary record of the individual and combination loop gains seen at the various ports in the course of the development of the matrix in FIG. 2.

FIG. 3 is a summary record in which are recorded the normalized loop gains and their net sums as the hypothetical conference circuit is developed. The left-hand column indicates the number of trunks and lines which are interconnected in the hypothetical conferences. Those conferences identified by asterisk are comprised of greater than six conferees and may be disregarded because network time slot control limits the number of conferees to six. They are, however, relevant to applications where the time slot control is not so limited. The numbers in the chart represent the net normalized loop gain sums seen at the conference ports identified at the head of each column, and the last column on the right identified under the heading SUM contains the sum of the net loop gain sums in each conference situation. The numbers in the SUM column represent the overall sum of the gains of each conference situation identified by the corresponding entry in the left-hand column, Port-to-port transmission phases shown in FIG. 2 are selected so as to minimize the gains shown in FIG. 3. All of the gains in the SUM column are less than 10, and, therefore, the conference circuit remains stable.

Beginning with a two-party trunk-to-trunk loop, the phase of the transmission from each trunk to the other was arbitrarily selected as normal. Thus, the signal retransmitted by either trunk port is not cancelled by the signal retransmitted by the other because each transmits in the same phase. For this reason, the gains recorded for the two-trunk, no-line (2T-0L) connection in the first line of the gain summary record in FIG. 3 are both positive and additive. Also, this is reflected in FIG. 2 where it is indicated that the phase of the transmissions from TT1 to RT2 and from TT2 to RT1 are each normal (+).

To the two-trunk loop connection was added a first conference line port L1, and the phases of the signal transmissions in the two-port loops between L1 and each of trunk ports T1 and T2 were selected as opposites to minimize the sum of the retransmitted signals at L1. The selection of these phases is reflected in FIG. 2 where it is shown that TL1 transmits to both RT1 and RT2 in normal phase; however, TT1 transmits to RL1 in inverted phase and TT2 transmits to RL1 in normal phase. Line-to-trunk loops have a normalized loop gain value of 1.5, thereby creating a net normalized loop gain sum of +4.5 for the T1, T2, L1 case as viewed from T2. These loop gains are recorded on the 2T-1L line in FIG. 3. Although this loop gain sum is well below the normalized value of 10 required for regenerative instability, it is sufficiently high to cause some loss distortion; therefore, it should be decreased by proper selection of transmission phases when adding a second line, L2, to the conference.

In order to decrease the sum of the loop gains at T2, the phase of transmission from T2 to L2 was selected inverted. Also, in order to reduce the loop gain sum at L2, transmission phase from T1 to L2 was selected normal, and in order to minimize the total gain sum for the two-trunk and two-line case, transmission phase from L1 to L2 was selected inverted, but the phase of transmission from L2 to L1 was selected normal. Line-to-line loop gains are normalized at 0.5, and the loop gains and their sums were recorded on the summary record of FIG. 3. FIG. 3 shows that the loop gain seen at T2 for the two-trunk, one-line (2T-1L) conference was decreased from +4.5 to +3 for the two-trunk, two-line (2T-2L) conference.

The above-described method of sequentially adding lines to the conference and selecting alternately normal and inverted transmission phases between the already connected and the added conference ports was continued until the phase of the transmission from every port to very other port was selected and recorded in FIG. 2. Transmission phase selections were made with an eye toward minimizing the sum of the net loop gains recorded in FIG. 3. This sequential method of developing a phase transmission matrix produces a practicable arrangement; however, there are limitations. Conference stability is maintained if the conferees are connected to the conference port circuits in numerical order. For example, if there is only one trunk conferee in a conference, the conferee should be connected to port T1. Similarly, line conferees should be connected to the conference line ports in numerical sequence, and if a conferee withdraws from the conference, the remaining conferees are advantageously reconnected if required to occupy the lowest-numbered line ports. Such switching capability is known in the art and is functionally incorporated in the netowrk time slot control 500, shown in FIG. 1.

It should be noted that the phase transmission natrix of FIG. 2 is the end product of multiple trials. A computer was employed to calculate the values of two-port and series three-port gains using actual circuit component values and methods of analysis known to persons skilled in the art. The resulting computer data were used as verification of the validity of the normalized loop gains recorded in FIG. 3. Port-to-port loops which exhibited high gain values (e.g., 8) were identified and the affected transmission phases reselected until reasonably low gains were realized (e.g., 6 or less). Acceptable gains vary from embodiment to embodiment in accordance with the stability margins required by the designer.

Figure 4:
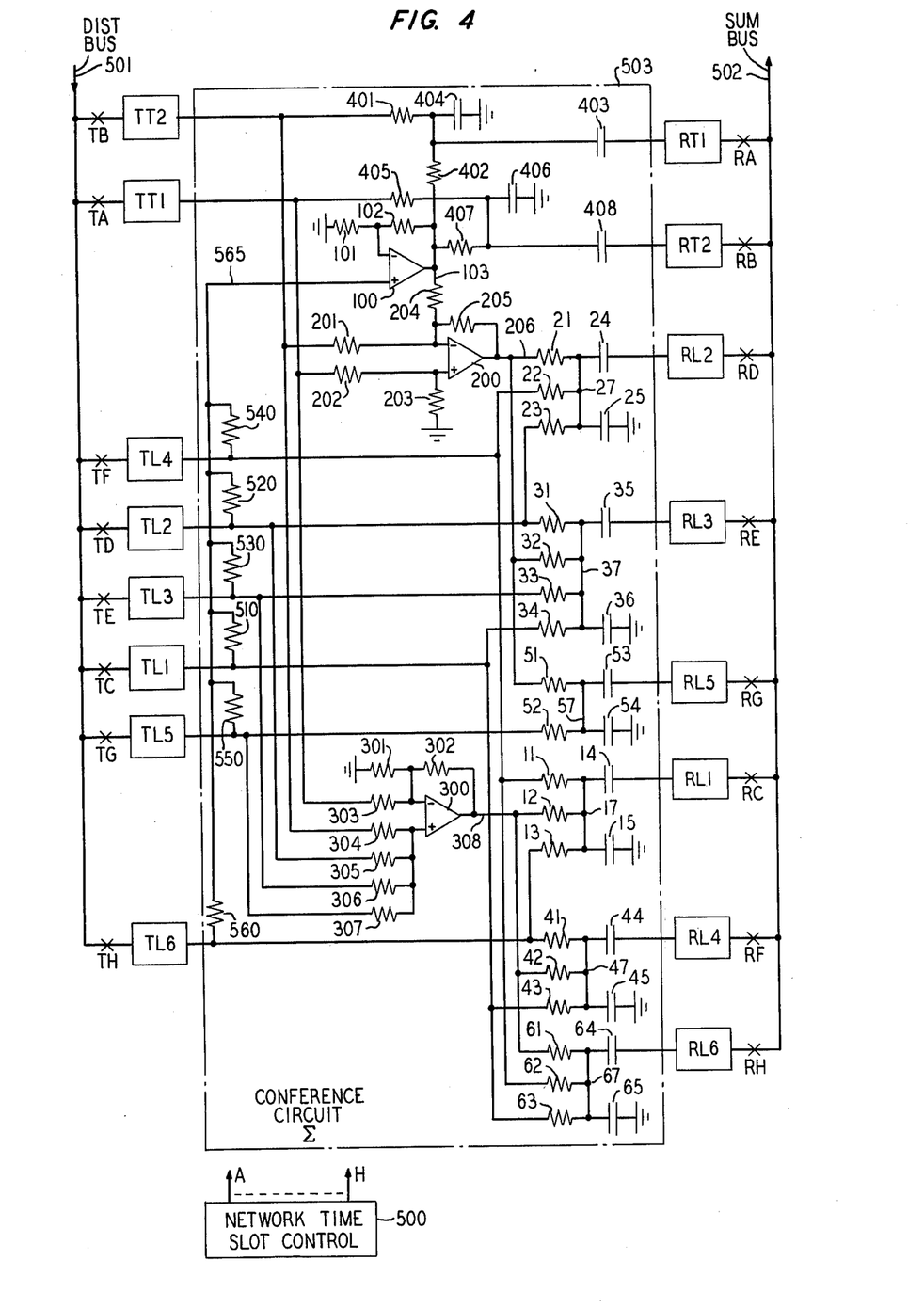
FIG. 4 shows an illustrative embodiment of the invention, partially in schematic form and partially in block and line form, within the context of a time division multiplex, private branch exchange.

FIG. 4 shows a specific illustrative embodiment of the invention. The numbers and letters which identify specific components and function blocks in FIG. 4 are correlated as much as possible to the identification symbols employed in FIG. 1. For sake of clarity of the drawing, the conference interface port function blocks retain the identification scheme employed in FIG. 1; however, the transmit and receive function blocks are shown separated from each other and out of numerical sequence. Moreover, the C-series coupling function blocks which couple the conference interface port transmit and receive function blocks in FIG. 1 are omitted in FIG. 4. Notwithstanding these and other minor variations between the illustrations, the system shown in FIG. 4 is intended to be the same as that shown in FIG. 1, with emphasis on the schematic illustration of the exemplary embodiment of conference circuit 503.

The transmission phase matrix which was developed in accordance with the above and shown in FIG. 2 is implemented in the specific exemplary embodiment of the invention shown in FIG. 4. Broadly, the essential function of conference circuit 503 shown schematically in FIG. 4 is to assemble the conference signals received from the conference interface port transmit function blocks (TT1, TT2 and TL1 to TL6) to provide for each conference interface port receive function block (RT1, RT2 and RL1 to RL6) a respective composite signal which contains as components the selectably phased signals from the other conference interface ports, and contains substantially no component of the signal transmitted by the same conference interface port. This concept is easily comprehended by reference to FIG. 2 where the phase of the signal components received at any conference interface port can be determined by locating the desired receive function block along the top line and reading the transmission phases in the column directly under it.

In FIG. 4, the outputs of the transmit conference interface port terminals which service lines, represented by function blocks TL1 to TL6, are connected via respectively associated resistors 510, 520, 530, 540, 550, and 560 to conductor 565 and the normal (+) input of amplifier 100. Conductor 103 at the output of amplifier 100 bears a composite signal comprised of the normal, noninverted signals outputted by the line transmitting function blocks of the conference interface ports. This composite signal may be characterized as:

$$+TL1+TL2+TL3+TL4+TL5+TL6 \qquad (1)$$

where a + or − sign used in conjunction with the symbol for a transmitting function block represents the conference signal transmitted by the function block. Here, the + signs indicate normal phase. Resistor 402 and d.c. blocking capacitor 403 conduct this composite signal to the first conference trunk receive block, RT1. Similarly, resistor 407 and capacitor 408 conduct the composite signal to RT2. In this manner, each of the conference interface ports which service lines transmits to the two conference interface ports which service trunks in normal phase as shown in FIG. 2 in the columns under RT1 and RT2. TT1 transmits to RT2 via resistor 405 and capacitor 408, and TT2 transmits to RT1 via resistor 401 and capacitor 403.

Resistor 204 is connected to conductor 103 and conducts the composite signal characterized in expression (1) to the inverting (−) input terminal of amplifier 200. In addition, the output of the second transmitting trunk port, TT2, is connected to the inverting input terminal of amplifier 200 via resistor 201, and the output of the first transmitting trunk port, TT1, is connected to the normal input of amplifier 200 via resistor 202. The output of amplifier 200 at conductor 206 bears a composite signal which may be characterized as:

$$-TL1-TL2-TL3-TL4-TL5-TL6+TT1-TT2 \qquad (2)$$

where the − signs indicate phase inversion.

The signal on conductor 206 is fed back to the inverting input of amplifier 200 via resistor 205 so as to maintain substantially unity gain through the amplifier. The signal on conductor 206 is also conducted via resistor 21, whose resistance value shall be assumed to be R ohms, to circuit node 27. The signal characterized as +TL2 is conducted via resistor 23, whose value is also R ohms, also to node 27. Furthermore, signal +TL4 conducts via resistor 22, whose resistance value is R/2 ohms, also to node 27. Since resistor 22 has one-half the resistance value of either resistors 21 or 23, signal +TL4 supplies twice the relative current of the other signals at node 27. Therefore, the composite signal at node 27 is characterized as:

$$-TL1-TL2-TL3-TL4-TL5-TL6+TT1-TT2+TL2+2TL4 \quad (3)$$

Reduction of this expression yields:

$$-TL1-TL3+TL4-TL5-TL6+TT1-TT2 \quad (4)$$

The signal characterized in expression (4) is transmitted via capacitor 24 to RL2. Note that in expression (4), signal −TL2 cancels signal +TL2, thereby preventing transmission from TL2 to RL2, as indicated in FIG. 2. Also, +2TL4 cancels −TL4, leaving +TL4. This operation is in accordance with FIG. 2, where it is indicated that transmission from TL4 to RL2 is normal (+) in phase, and typifies the accomplishment of phase reversal by means of signal overcancellation.

The signal combining concept disclosed hereinabove is repeatedly implemented at the conference circuit nodes associated with the remaining conference receive ports shown in FIG. 4. In a manner analogous to amplifier 100, amplifier 300 receives analog signals at its input terminals via resistors 303, 304, 305, 306 and 307 so as to create a composite signal at output conductor 308 which may be characterized as:

$$-TT1+TT2+TL2+TL3+TL5 \quad (5)$$

This composite signal is transmitted to circuit node 17 via resistor 12. In addition, signals +TL6 and +TL4 conduct to node 17 via respective resistors 13 and 11. Resistors 11, 12 and 13 are all of equal resistance value; therefore, the signal at node 17 which is transmitted to RL1 via capacitor 14 may be characterized as:

$$-TT1+TT2+TL2+TL3+TL4+TL5+TL6 \quad (6)$$

Note that there is no +TL1 signal component in this composite signal, and this is in accordance with FIG. 2, wherein it is indicated that there is no transmission from TL1 to RL1. Moreover, the signs of the signal components in expression (6) agree with those shown in the column under RL1 in FIG. 2.

It should be noted that capacitors 14, 24, 35, 44, 53, 64, 403 and 408 serve a dual purpose. Conference interface port circuits of the type used in the illustrative embodiment of this invention generally require a d.c. offset voltage. The capacitors serve to block the d.c. voltage from the signal-summing resistors. In addition, however, careful selection of the capacitor values provides low-frequency roll-off of the system frequency response. It has been determined that conference circuits are susceptible to instability in the frequency range of about 30 Hz. The capacitors, in an illustrative embodiment of this invention, have been selected to roll off the frequency response of the conference circuit at frequencies below 100 Hz. Thus, system gain is quite low at about 30 Hz, thereby substantially reducing the possibility of low frequency instability.

Capacitors 15, 25, 36, 45, 54, 65, 404 and 406 serve to reduce high frequency response above 8 kHz. Sample and hold processes within the TDM-PBX produce step functions which contain high frequency energy near 8 kHz. Such high frequency energy is delivered to ground via these capacitors, thereby reducing high frequency distortion and the possibility of instability.

Conference system gain is determined by the advantageous selection of those resistances which conduct the conference signals to the receive terminals of the conference interface ports or to the operational amplifiers in the conference circuit. In this embodiment of the invention, the values of resistors 201, 202, 303, 304, 401 and 405 are selected to provide such additional gain to conference trunk signals over conference line signals that uniform transmission levels are achieved. Selection of resistor values will vary from embodiment to embodiment depending on the particular characteristics of the conference signals delivered to the conference circuit, and will be obvious to persons skilled in the art.

An operative embodiment at the conference arrangement in FIG. 4 was constructed using the following circuit component values:

| TABLE OF COMPONENT VALUES | |
|---|---|
| Component | Value |
| 11 | 26.7 K ohms |
| 12 | 26.7 K ohms |
| 13 | 26.7 K ohms |
| 14 | 0.1 μf |
| 15 | 0.0047 μf |
| 21 | 20.0 K ohms |
| 22 | 10.0 K ohms |
| 23 | 20.0 K ohms |
| 24 | 0.12 μf |
| 25 | 0.00681 μf |
| 31 | 2.87 K ohms |
| 32 | 5.76 K ohms |
| 33 | 5.76 K ohms |
| 34 | 2.87 K ohms |
| 35 | 0.22 μf |
| 36 | 0.022 μf |
| 41 | 26.7 K ohms |
| 42 | 26.7 K ohms |
| 43 | 26.7 K ohms |
| 44 | 0.1 μf |
| 45 | 0.0047 μf |
| 51 | 34.0 K ohms |
| 52 | 34.0 K ohms |
| 53 | 0.0681 μf |
| 54 | 0.00392 μf |
| 61 | 26.7 K ohms |
| 62 | 26.7 K ohms |
| 63 | 26.7 K ohms |
| 64 | 0.1 μf |
| 65 | 0.0047 μf |
| 101 | 2.0 K ohms |
| 102 | 10.0 K ohms |
| 201 | 10.0 K ohms |
| 202 | 20.0 K ohms |
| 203 | 15.8 K ohms |
| 204 | 15.8 K ohms |
| 205 | 15.8 K ohms |
| 301 | 7.87 K ohms |
| 302 | 15.8 K ohms |
| 303 | 10.0 K ohms |
| 304 | 10.0 K ohms |
| 305 | 15.8 K ohms |
| 306 | 15.8 K ohms |
| 307 | 15.8 K ohms |
| 401 | 8.66 K ohms |
| 402 | 13.0 K ohms |
| 403 | 0.12 μf |
| 404 | 0.00681 μf |
| 405 | 8.66 K ohms |
| 406 | 0.00681 μf |
| 407 | 13.0 K ohms |
| 408 | 0.12 μf |
| 510 | 400.0 ohms |
| 520 | 400.0 ohms |
| 530 | 400.0 ohms |
| 540 | 400.0 ohms |
| 550 | 400.0 ohms |
| 560 | 400.0 ohms |

The hereinabove-described exemplary embodiment is illustrative of the application of the principles of the invention. It is to be understood that, in light of this teaching, numerous other arrangements may be devised by those skilled in the art without departing from the spirit and scope of the invention.

What is claimed is:

1. A conference circuit for establishing a simultaneous interchange of information among plural ports, each of which ports contains at least a first terminal for transmitting the analog information signal of a respectively associated conferee and at least a second terminal for receiving the combined analog information signals transmitted from the other ports, a portion of which combined analog information signals is retransmitted through such port to the first terminal thereof, the conference circuit comprising:

means for mixing signals from the first terminal of each of a plurality of the ports to produce a separate signal for the second terminal of each of a plurality of the ports, each port comprising with the mixing means and the other ports a different potentially oscillatory loop circuit, each of the separate signals comprising the algebraic sum of the analog information signals from the first terminal of each of a plurality of the ports in selectable phases and amplitude proportions so as to offset the retransmitted signals against one another to a sufficient degree to inhibit oscillations in each such loop circuit.

2. A conference circuit in accordance with claim 1 in which the mixing means comprises:

plural amplifiers each having phase inverting and phase normal input terminals and an output terminal, gain determinative means connected to each amplifier for achieving a desired transmission level, and plural resistance paths for connecting the respective first terminals of selectable ports to selectable ones of the input terminals of the amplifiers.

3. A conference circuit in accordance with claim 2 in which the gain determinative means of each amplifier comprises:

the plural resistance paths, and a resistance path connected to the output terminal of a respective amplifier and a selectable one of the input terminals for creating a feedback loop.

4. A conference circuit in accordance with claim 1 in which the mixing means comprises:

plural resistive paths bearing such resistance-value relationships to one another that the currents of the respective analog information signals conducted therethrough are combined with one another in such selectable proportions as to make available at the second terminal of each port a respective composite information signal comprised of a summation of selectably phased analog information signals transmitted from selectable ports.

5. The conference circuit in accordance with claim 1 in which the mixing means comprises:

at least one means for summing signals from a predetermined portion of said first terminals of said ports to produce an intermediate signal, a plurality of means for combining signals from the first terminals to produce the separate signals, and means for coupling the intermediate signals to inputs of predetermined ones of the combining means.

6. The conference circuit in accordance with claim 5 in which:

at least two of the summing means are provided, and means are provided for coupling an intermediate signal from an output of a first one of the summing means to an input of a second one of the summing means.

7. The conference circuit in accordance with claim 5 in which the summing means comprises:

an operational amplifier having phase normal and phase inverting input terminals, and an output terminal.

8. A method for establishing a simultaneous interchange of information among plural conference ports, each of which ports contains terminals for transmitting the analog information signal of a respectively associated conferee and terminals for receiving the combined analog information signals from the other ports, a portion of which combined analog information signals is retransmitted through such port to the transmitting terminal thereof, the method comprising the steps of:

1. combining the information signals transmitted by first and second sets of ports to create respective first and second composite signals,
   2. combining the first composite signal with the information signals transmitted by a selectable third set of ports, excluded from the first set of ports, in selectable phases to create a third composite signal,
   3. distributing the first composite signal to the third set of ports via resistive electrical pathways,
   4. distributing the second and third composite signals respectively to fourth and fifth sets of ports via resistive electrical pathways, and
   5. distributing the information signals transmitted by the ports to selectable ones of the ports via resistive electrical pathways, which pathways bear resistance value relationships to the pathways which conduct the composite signals to each port.

* * * * *